United States Patent
Stopczynski

(10) Patent No.: US 6,522,287 B1
(45) Date of Patent: Feb. 18, 2003

(54) USING HOST VEHICLE DYNAMICS FOR SIDE-LOOKING AUTOMOTIVE PRE-CRASH SENSOR AIMING CONTROL

(75) Inventor: Lawrence Gerard Stopczynski, Milford, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/064,231

(22) Filed: Jun. 24, 2002

(51) Int. Cl.[7] ............................................. G01S 13/93
(52) U.S. Cl. ........................... 342/70; 342/71; 342/72; 180/271; 701/45
(58) Field of Search .............................. 342/70, 71, 72; 180/271, 274, 282; 280/730.1, 730.2, 735, 736, 737; 340/435, 436, 903; 701/225, 301, 45

(56) References Cited

U.S. PATENT DOCUMENTS

| | | | | |
|---|---|---|---|---|
| 5,694,130 A | * | 12/1997 | Suzuki et al. | 342/70 |
| 5,767,803 A | * | 6/1998 | Yamada | 342/69 |
| 6,067,038 A | * | 5/2000 | Uehara et al | 342/70 |
| 6,343,810 B1 | * | 2/2002 | Breed | 280/730.2 |
| 6,209,909 B1 | * | 4/2002 | Breed | 280/735 |
| 6,295,495 B1 | * | 9/2002 | Morman et al. | 701/45 |
| 6,480,102 B1 | * | 11/2002 | Miller et al. | 342/71 X |
| 2002/0092693 A1 | * | 7/2002 | Breed | 180/282 |
| 2002/0147534 A1 | * | 10/2002 | Delcheccolo et al. | 701/45 |
| 2002/0166710 A1 | * | 11/2002 | Breed | 180/282 |

* cited by examiner

Primary Examiner—John B. Sotomayor
(74) Attorney, Agent, or Firm—Frank A. MacKenzie

(57) ABSTRACT

The antenna of a side-looking pre-crash sensor (12) is aimed, either electronically or mechanically, in correlation with the travel velocity of a host vehicle (10). As the forward travel velocity of the host increases, the antenna beam (16) remains aimed laterally, but in an increasingly forward direction.

12 Claims, 1 Drawing Sheet

USING HOST VEHICLE DYNAMICS FOR SIDE-LOOKING AUTOMOTIVE PRE-CRASH SENSOR AIMING CONTROL

BACKGROUND OF INVENTION

1. Field of the Invention

This invention relates to land vehicles, such as a passenger car or truck that has a side-looking pre-crash sensor for anticipating impact by a closing object, such as another motor vehicle, from a direction that is non-parallel to the direction of travel of the host vehicle. Such a sensor is used in conjunction with an on-board occupant restraint system that is deployed to aid in restraint of an occupant upon detection of an impact of the closing object with the host vehicle exceeding a settable impact threshold. Such a sensor may employ any of several different technologies, such as radar, lidar, and optical recognition, for acquiring such closing objects.

2. Background Information

The state of the art is reflected by U.S. Pat. Nos. 5,694, 130; 5,767,803; and 6,067,038 that were developed during a preliminary novelty search and disclose various on-board radar systems for detecting objects in the vicinity of a traveling host vehicle. For example, U.S. Pat. No. 5,767,803 discloses a forward-looking system that is said to be capable of distinguishing an on-coming vehicle that is in the same lane as the host vehicle from an on-coming vehicle that is not. The other two patents are concerned with ranging and scanning of a lead vehicle.

Although it is apparently not a subject of interest of discussion in those three patents, an on-board side-looking sensor can detect an object that is closing on the host vehicle from a direction that is lateral to the direction of travel of the host vehicle. Such a pre-crash sensor can anticipate impact of the closing object with the host vehicle and interact with an on-board occupant restraint system to set a threshold for a dynamic condition at which the restraint system will deploy an occupant restraint in the host vehicle. Insofar as the inventor is aware, such sensors have heretofore been aimed in a particular direction on a vehicle on the ostensibly tacit assumption that the antenna beam width will be sufficient to detect those closing objects that should be detected.

SUMMARY OF INVENTION

The invention arises through the inventor's recognition that the foregoing assumption may not provide an optimal solution in all instances. The inventor has discovered that travel velocity of the host vehicle can at least under some conditions have a significant influence on certain aspects of detection capability. As a consequence of that discovery the inventor has created a system that takes that factor into account.

Whether a collision between a host vehicle and a closing object will occur depends on many factors including the range, the velocity, and the travel direction of the closing object and the velocity and the travel direction of the host vehicle, subject to any evasive action that may be taken. If a host vehicle has a side-looking pre-crash sensor aimed in a direction that is non-parallel to the longitudinal fore-aft axis of the vehicle, the limited azimuthal span of the sensor field of view may prevent successful detection of closing objects lying outside that span. Even if a closing object is successfully detected, the precision of data derived by processing information acquired by the sensor may be subject to tolerance because of various factors.

Accuracy of such information may be important in setting a deployment threshold for an on-board occupant restraint that is intended for deployment in consequence of detection of impacts from a direction that is non-parallel to a longitudinal fore-aft axis of the host vehicle.

In general, the solution provided by the present invention concerns aiming the sensor aperture, either electronically or mechanically, in correlation with the travel velocity of the host vehicle. Using a radar sensor for an example, the radar antenna beam remains aimed laterally, but in an increasingly forward direction as the forward travel velocity of the host increases.

Accordingly, one generic aspect of the present invention relates to an on-board system of a host vehicle traveling on land at a travel velocity in a direction of travel for acquiring a closing object having potential for impacting the host vehicle from a direction non-parallel to the direction of travel of the host vehicle. The system comprises an aperture having a field of view of limited azimuthal span and pointed in azimuth in a direction that is non-parallel to the direction of host vehicle travel for enabling acquisition of such an object, and apparatus for changing, in azimuth, the angle between the direction in which the aperture is pointed and the fore-aft axis of the host vehicle in correlation with travel velocity of the host vehicle in the direction of travel.

Another generic aspect of the present invention relates to a method for acquiring a closing object having potential for impacting a host vehicle from a direction non-parallel to the direction of travel of the host vehicle. The method comprises pointing an aperture that has a field of view of limited azimuthal span, in azimuth, in a direction that is non-parallel to the direction of host vehicle travel for enabling acquisition of such an object, and changing, in azimuth, the angle between the direction in which the aperture is pointed and the fore-aft axis of the host vehicle in correlation with travel velocity of the host vehicle in the direction of travel.

Still another generic aspect of the present invention relates to a host vehicle traveling on land at a travel velocity in a direction of travel comprising an on-board acquisition system for acquiring a closing object having potential for impacting the host vehicle from a direction non-parallel to the direction of travel of the host vehicle. The on-board system comprises a) an aperture having a field of view of limited azimuthal span and pointed, in azimuth, in a direction that is non-parallel to the direction of host vehicle travel for enabling acquisition of such an object, and b) apparatus for changing, in azimuth, the angle between the direction in which the aperture is pointed and the fore-aft axis of the host vehicle in correlation with at least one operating parameter related to operation of the host vehicle. An on-board processor processes data for one or more of the operating parameters related to operation of the host vehicle and data for one or more parameters related to closing of an acquired object derived at least in part from information acquired by the aperture to yield a processing result. Another on-board system is acted upon by the processing result.

BRIEF DESCRIPTION OF DRAWINGS

The drawings that will now be briefly described are incorporated herein to illustrate a preferred embodiment of the invention and a best mode presently contemplated for carrying out the invention.

DETAILED DESCRIPTION

Figures 1, 2:
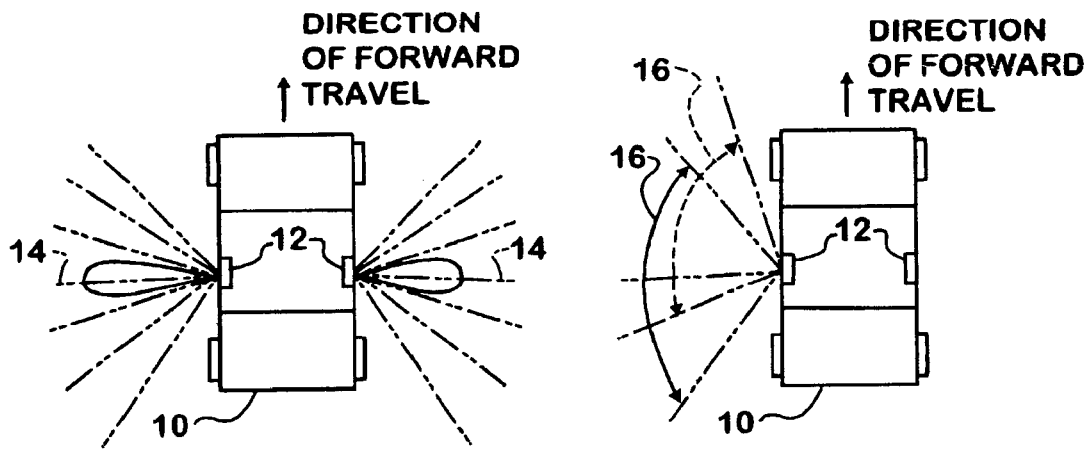
FIG. 1 is a top plan schematic diagram of a host vehicle having side-looking pre-crash sensors on both sides of the vehicle.
FIG. 2 is another top plan schematic diagram for explaining certain principles of the present invention.

FIG. 1 shows a host vehicle 10 having an on-board system comprising side-looking pre-crash sensors 12 on both sides of the vehicle. Each sensor 12 is shown by example as a radar type sensor that comprises an antenna that radiates a beam of electromagnetic radiation at an appropriate frequency along a beam axis 14 that is non-parallel to the longitudinal fore-aft axis of the vehicle. FIG. 1 further shows that each sensor 12 is of the type that can aim, or point, its beam axis 14 in any of multiple directions. When pointed in any of those directions the beam has a defined beam width. Each sensor has a limited azimuthal field of view 16.

In accordance with principles of the invention, each antenna transmits radiation along its beam axis 14 non-parallel to the direction of host vehicle travel and can detect reflected radiation indicative of objects illuminated by the emitted radiation, thereby acquiring such objects. Motion of such an object relative to vehicle 10 can be detected by an on-board processor of the system and processed to disclose potential impact of that object with vehicle 10. Such an object may be another vehicle.

Measures can then be taken to set values for certain variables relevant to another on-board system of the host vehicle, such as for example, a settable threshold of an on-board occupant restraint system for restraint deployment.

To enhance both object acquisition capability and precision of data resulting from processing information derived from detection of the radiation reflected back to the antenna, the antenna is aimed, or pointed, in correlation with travel velocity of vehicle 10. Each sensor 12 possesses the capability for aiming its antenna at different angles relative to the direction of host vehicle travel, including aiming the antenna at angles correlated with travel velocity of the host vehicle in the direction of travel.

In particular each sensor 12 aims its antenna increasingly toward the direction of travel of the host vehicle with increasing travel velocity of the host vehicle in the direction of travel, as portrayed by FIG. 2 for the left side sensor 12. The solid line position shows the field of view 16 when the vehicle is stationary or moving very slowly. The broken line position shows the field of view 16 when the vehicle is moving more rapidly and the antenna is aimed more forwardly.

Figure 3:
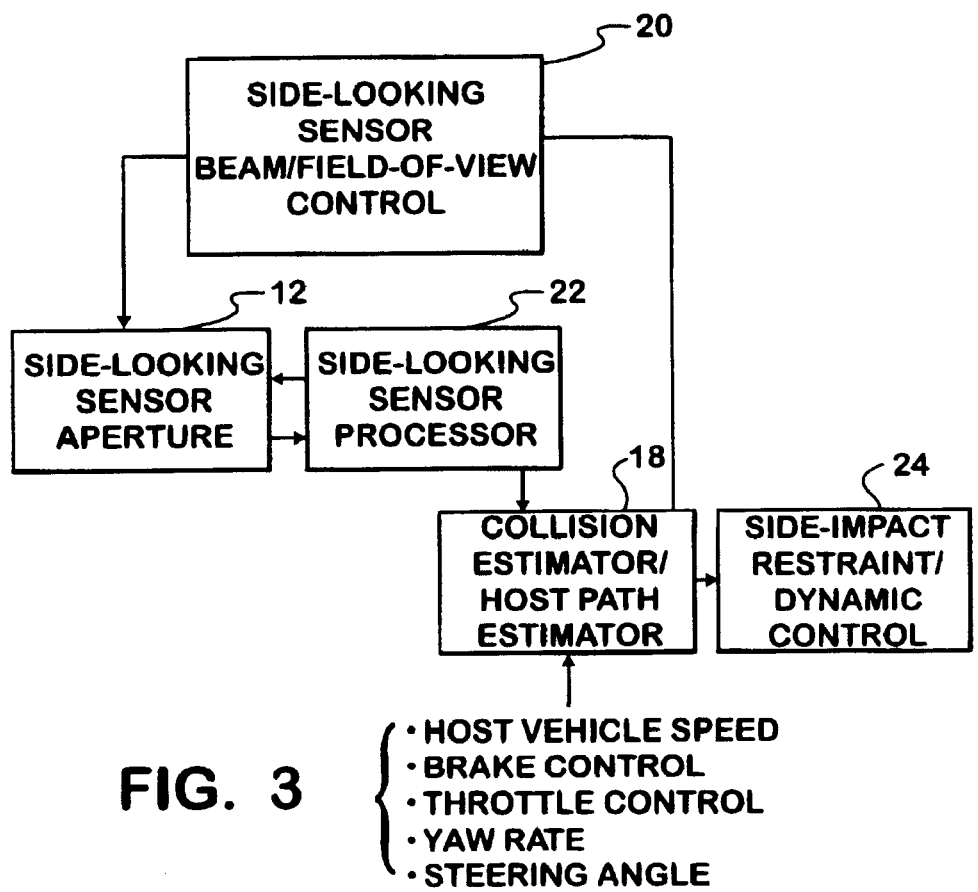
FIG. 3 is a block diagram of the inventive system in a host vehicle.

FIG. 3 shows additional elements of the overall system. An antenna of a sensor 12 is represented by a block 12 designated Side-Looking Sensor Aperture. A block labeled Collision Estimator/Host Path Estimator 18 receives various input data including vehicle speed data, extent of vehicle throttle actuation, extent of vehicle brake actuation, yaw rate, and vehicle steering angle. Steering angle and yaw are mathematically related if the vehicle has traction, and so one is considered equivalent to the other in that instance. Loss of traction may destroy equivalency. Aiming of the sensor antenna is performed by a block designated Side-Looking Sensor Beam/ Field-of-View Control 20 using one or more of the data inputs just mentioned. Control of radar beam transmissions and detection and processing of reflections of radar beam transmissions are performed by a block labeled Side-Looking Sensor Processor 22.

When a closing object is acquired and information about it processed to yield a processing result, the settable threshold of the restraint system is set to an appropriate setting such that the restraint will be deployed either in anticipation of impact by the acquired object or upon detection of actual impact exceeding the setting of the settable threshold. This is represented by a block labeled Side-Impact Restraint / Dynamic Control 24. Other on-board systems may use processing results, an example being a control system for causing the host vehicle to automatically take evasive action to avoid, or minimize the effect of, collision with a closing object that has been acquired.

Aiming of a sensor antenna may be performed either mechanically by electromechanical control of an aiming mechanism or electronically by electronic scanning. Various forms of sensor technologies, such as the ones mentioned earlier, may be used in practice of the invention, although it is presently believed that radar will be most likely used because it is relatively insensitive to various weather and atmospheric conditions. Radar and lidar are considered active technologies because they transmit radiation and acquire a closing object by receiving and processing reflected radiation. Optical recognition technology is considered a passive technology because it transmits no radiation and relies on optical acquisition and processing of optically acquired information.

While a presently preferred embodiment has been illustrated and described, it is to be appreciated that the invention may be practiced in various forms within the scope of the following claims.

What is claimed is:

1. An on-board system of a host vehicle traveling on land at a travel velocity in a direction of travel for acquiring a closing object having potential for impacting the host vehicle from a direction non-parallel to the direction of travel of the host vehicle, the system comprising:

an aperture having a field of view of limited azimuthal span and pointed in azimuth in a direction that is non-parallel to the direction of host vehicle travel for enabling acquisition of such an object; and apparatus for changing, in azimuth, the angle between the direction in which the aperture is pointed and the fore-aft axis of the host vehicle in correlation with travel velocity of the host vehicle in the direction of travel.

2. An on-board system as set forth in claim 1 wherein the apparatus for changing, in azimuth, the angle between the direction in which the aperture is pointed and the fore-aft axis of the host vehicle in correlation with travel velocity of the host vehicle in the direction of travel comprises pointing the aperture increasingly toward the direction of travel of the host vehicle with increasing travel velocity of the host vehicle in the direction of travel.

3. An on-board system as set forth in claim 1 wherein the apparatus for changing, in azimuth, the angle between the direction in which the aperture is pointed and the fore-aft axis of the host vehicle in correlation with travel velocity of the host vehicle in the direction of travel comprises a mechanical system for mechanically pointing the aperture on the host vehicle.

4. An on-board system as set forth in claim 1 wherein the apparatus for changing, in azimuth, the angle between the direction in which the aperture is pointed and the fore-aft axis of the host vehicle in correlation with travel velocity of the host vehicle in the direction of travel comprises an electronic system for electronically pointing the aperture on the host vehicle.

5. In a host vehicle traveling on land at a travel velocity in a direction of travel, a method for acquiring a closing object having potential for impacting the host vehicle from a direction non-parallel to the direction of travel of the host vehicle, the method comprising:

pointing an aperture that has a field of view of limited azimuthal span, in azimuth, in a direction that is non-parallel to the direction of host vehicle for enabling acquisition of such an object; and changing, in azimuth, the angle between the direction in which the aperture is pointed and the fore-aft axis of the host vehicle in correlation with travel velocity of the host vehicle in the direction of travel.

6. A method as set forth in claim 5 wherein the step of changing, in azimuth, the angle between the direction in which the aperture is pointed and the fore-aft axis of the host vehicle in correlation with travel velocity of the host vehicle in the direction of travel comprises pointing the aperture increasingly toward the direction of travel of the host vehicle with increasing travel velocity of the host vehicle in the direction of travel.

7. A method as set forth in claim 5 wherein the step of changing, in azimuth, the angle between the direction in which the aperture is pointed and the fore-aft axis of the host vehicle in correlation with travel velocity of the host vehicle in the direction of travel comprises mechanically pointing the aperture on the host vehicle.

8. A method as set forth in claim 7 wherein the step of changing, in azimuth, the angle between the direction in which the aperture is pointed and the fore-aft axis of the host vehicle in correlation with travel velocity of the host vehicle in the direction of travel comprises electronically pointing the aperture on the host vehicle.

9. A host vehicle traveling on land at a travel velocity in a direction of travel comprising:

an on-board acquisition system for acquiring a closing object having potential for impacting the host vehicle from a direction non-parallel to the direction of travel of the host vehicle, the on-board system comprising a) an aperture having a field of view of limited azimuthal span and pointed, in azimuth, in a direction that is non-parallel to the direction of host vehicle travel for enabling acquisition of such an object, and b) apparatus for changing, in azimuth, the angle between the direction in which the aperture is pointed and the fore-aft axis of the host vehicle in correlation with at least one operating parameter related to operation of the host vehicle;

an on-board processor processing data for one or more of the operating parameters related to operation of the host vehicle and data for one or more parameters related to closing of an acquired object derived at least in part from information acquired by the aperture to yield a processing result; and another on-board system that is acted upon by the processing result.

10. A host vehicle as set forth in claim 9 wherein the other on-board system comprises an occupant restraint system that is deployed to aid in restraint of an occupant of the host vehicle in consequence of the value of one or more variables associated with impact of the acquired object with the host vehicle from a direction non-parallel to the direction of travel of the host vehicle exceeding a corresponding settable value for the corresponding variable, and wherein the corresponding settable value of such a variable is set in accordance with the processing result.

11. A host vehicle as set forth in claim 9 wherein the data for the one or more of the operating parameters related to operation of the host vehicle include one or more of host vehicle travel velocity, extent of vehicle throttle actuation, extent of vehicle brake actuation, vehicle yaw rate, and vehicle steering angle.

12. A host vehicle as set forth in claim 9 wherein the apparatus for changing, in azimuth, the angle between the direction in which the aperture is pointed and the fore-aft axis of the host vehicle in correlation with at least one operating parameter related to operation of the host vehicle comprises pointing the aperture increasingly toward the direction of travel of the host vehicle with increasing travel velocity of the host vehicle in the direction of travel.

* * * * *